US005802011A

United States Patent [19]

Winters et al.

[11] Patent Number: 5,802,011

[45] Date of Patent: Sep. 1, 1998

[54] PRESSURE SIGNALLING FOR FLUIDIC MEDIA

[75] Inventors: Warren J. Winters, Tulsa; Tommy M. Warren, Coweta, both of Okla.

[73] Assignee: Amoco Corporation, Chicago, Ill.

[21] Appl. No.: 539,186

[22] Filed: Oct. 4, 1995

[51] Int. Cl.$^{6}$ .......... G01V 1/40

[52] U.S. Cl. .......... 367/83

[58] Field of Search .......... 367/85, 84, 83

[56] References Cited

U.S. PATENT DOCUMENTS

| | | | |
|---|---|---|---|
| 2,787,759 | 4/1957 | Arps | 367/175 |
| 3,736,558 | 5/1973 | Cubberly, Jr. | 367/85 |
| 3,958,217 | 5/1976 | Spinnler | 367/83 |
| 4,869,100 | 9/1989 | Birdwell | 367/85 |
| 5,272,680 | 12/1993 | Stone et al. | 367/85 |

*Primary Examiner*—Ian J. Lobo

*Attorney, Agent, or Firm*—Stephen G. Mican; Frank J. Sroka

[57] ABSTRACT

A method and apparatus for remotely generating pressure signals in a fluid stream for telemetry purposes with minimal insertion loss and susceptibility to blocking flow of the fluid stream by providing a straight through acceleration path for the fluid stream followed by a straight through diffusion path, wherein pressure pulses representing data are generated by turbulence resulting from periodic disturbances made in the diffusion path.

18 Claims, 8 Drawing Sheets

PRESSURE SIGNALLING FOR FLUIDIC MEDIA

FIELD OF THE INVENTION

The present invention relates to the generation of pressure signals in fluidic media for signalling and telemetry applications, and more particularly to measurement while drilling (MWD) systems that use a fluidic mud pulsing valve (MPV) for transmission of pressure encoded data for an associated mud pulse telemetry system.

BACKGROUND OF THE INVENTION

MWD systems are now available to the drilling industry for directional drilling measurements. The potential for considerable savings in rig time has spurred the acceptance and usage of MWD for such directional measurements and other sensors for improved drilling accuracy and efficiency.

Earliest attempts to provide MWD data included the transmission of downhole electrical signals representing measured parameters to the surface by an insulated cable mounted inside the drill pipe. This method of MWD was neither economically nor technically sound enough to attain much success in the drilling industry.

In recent years MPV telemetry systems have been successfully developed for transmitting drilling and formation parameter data to the surface. In these systems, the data is transmitted by causing changes in the upstream pressure of the drilling mud supplied to the drill string. The pressure is controlled by a telemetry valve mounted in the drill string proximate at least one sensor for a drilling or formation parameter to be measured. The sensor controls the telemetry valve in such a way that the upstream drilling mud pressure represents the measured data.

There are three general types of mud pressure pulsing telemetry valves in use at this time, comprising the negative pressure pulse, positive pressure pulse, and continuous wave types. The negative pressure pulse type employs a bypass valve from inside the drill string to the annulus between the drill string and the well wall. The positive pressure pulse type employs a flow restriction valve inside the drill string. The continuous wave type employs a flow restrictive rotating turbine inside the drill string.

Most valve designs in use, of what ever type, use variable area control of an orifice for modulation of the flow stream to develop a signal. Variable area control inherently causes significant insertion loss and susceptibility to clogging or plugging. Those valves that induce turbulence to modulate the flow stream have used a vortex that has required a circuitous path for the flow stream through the valve, thereby causing high insertion loss, increasing complexity of design, and making the valve susceptible to plugging.

Problems with all the telemetry valves in current use therefore include relatively high insertion loss and susceptibility to plugging with lost circulation material. The high insertion loss means that relatively high power is required to operate the system and that the developed pressure signal is relatively poor. Susceptibility to plugging means that the system is prone to failure.

SUMMARY OF THE INVENTION

The present invention overcomes specific limitations of prior art pressure pulsing fluidic telemetry valves by providing low insertion loss combined with a straight line fluid flow path that is resistant to clogging. In particular, the valve has a straight through fluid stream accelerator section followed by a straight through fluid stream diffusion section. The combination provides low steady state insertion loss so that the quiescent upstream mud pressure is low. The valve additionally includes a diffusion disturbance element that periodically generates turbulence in the diffusion section to create positive pressure pulses that represent data for a measured parameter. The diffusion disturbance element is controlled by an actuator that is coupled to a sensor for the measured parameter.

The term "turbulence" as used herein is expanded to apply to both rotational and non-rotational flow, in the sense that it encompasses any disturbance of the flow stream that reduces the recovery of potential energy in the diffuser section of the valve from kinetic energy developed in the acceleration section of the valve. Thus, turbulence may also include the rotation of the flow stream, because the rotation will reduce the conversion of kinetic energy developed in the accelerator section of the valve back to potential energy in the diffusion section of the valve.

More specifically, one aspect of the invention is a method of generating pressure signals through a fluidic medium, comprising the steps of: accelerating a flow stream of said fluidic medium to increase the kinetic energy of said flow stream; diffusing said accelerated flow stream to substantially decrease the kinetic energy of said flow stream; and periodically disturbing said diffusion to generate turbulence that creates said pressure signals as positive upstream pressure pulses for said flow stream.

A related aspect of the invention is an apparatus for generating pressure signals through a fluidic medium, comprising: means for accelerating a flow stream of said fluidic medium to increase the kinetic energy of said flow stream; means for diffusing said accelerated flow stream to substantially decrease the kinetic energy of said flow stream; and means for periodically disturbing said diffusion to generate turbulence that creates said pressure signals as upstream pressure pulses for said flow stream.

Another aspect of the invention is a method of signalling parameter data through a fluidic medium, comprising the steps of: accelerating a flow stream of said fluidic medium to increase the kinetic energy of said flow stream; diffusing said accelerated flow stream to substantially decrease the kinetic energy of said flow stream; and periodically disturbing said diffusion to generate turbulence that creates said pressure signals with positive upstream pressure pulses for said flow stream that correspond to said parameter data.

A related aspect of the invention is an apparatus for signalling parameter data through a fluidic medium, comprising: means for accelerating a flow stream of said fluidic medium to increase the kinetic energy of said flow stream; means for diffusing said accelerated flow stream to substantially decrease the kinetic energy of said flow stream; and means for periodically disturbing said diffusion to generate turbulence that creates upstream pressure pulses for said flow stream that correspond to said parameter data.

Still another aspect of the invention is a method of controlling pressure activated devices through a fluidic medium, comprising the steps of: accelerating a flow stream of said fluidic medium to increase the kinetic energy of said flow stream; diffusing said accelerated flow stream to substantially decrease the kinetic energy of said flow stream; and periodically disturbing said diffusion to generate turbulence that creates positive upstream pressure pulses for said flow stream that control said pressure operated devices.

A related aspect of the invention is an apparatus for controlling pressure operated devices through a fluidic medium, comprising: means for accelerating a flow stream of said fluidic medium to increase the kinetic energy of said flow stream; means for diffusing said accelerated flow stream to substantially decrease the kinetic energy of said flow stream; and means for periodically disturbing said diffusion to generate turbulence that creates upstream pressure pulses for said flow stream that control said pressure operated devices.

Other aspects of the invention, as well as other advantages and improvements over the prior art will be apparent from the description of the preferred embodiments of the invention as set forth below in connection with the accompanying drawings.

DESCRIPTION OF THE PREFERRED EMBODIMENTS

Figure 1:
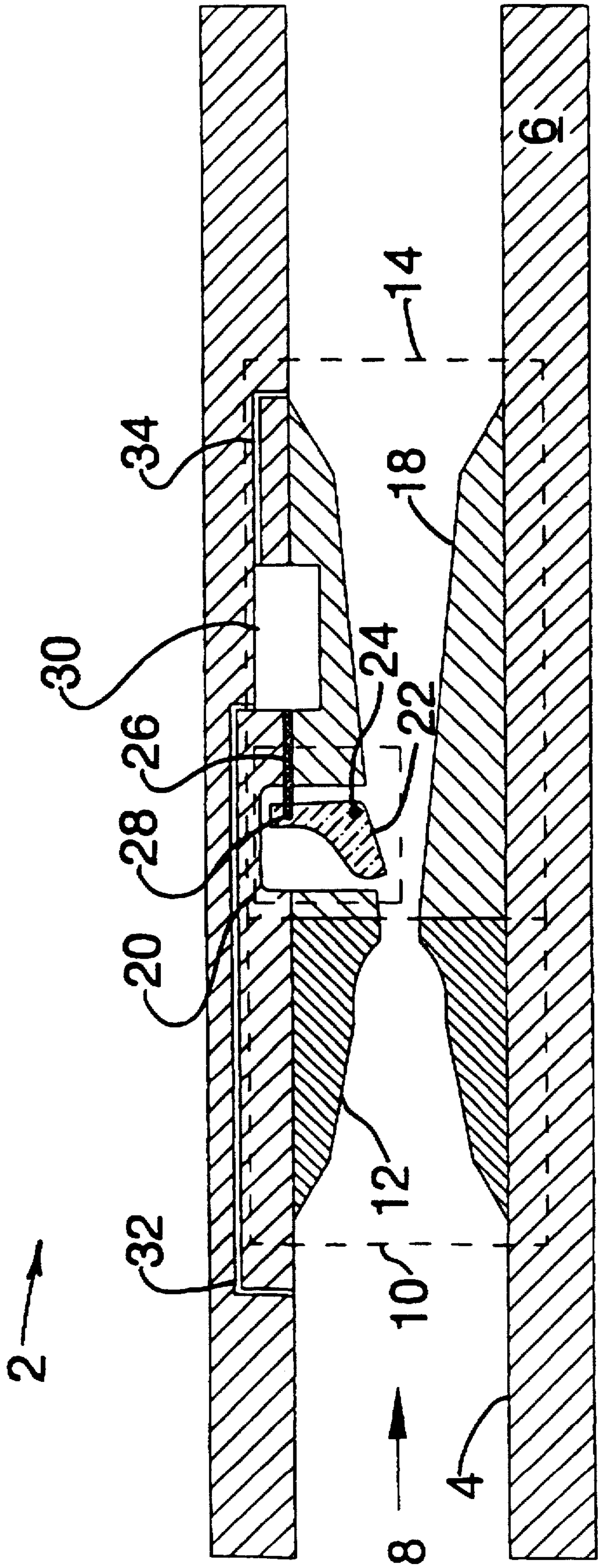
FIG. 1 shows a cut away side view of a preferred embodiment of the invention.

Referring to the drawings, wherein reference characters represent like or corresponding parts throughout the views, FIG. 1 shows a preferred embodiment of the invention , wherein a pressure pulsing fluidic telemetry valve 2 is mounted within a bore 4 of a standard drill collar 6. A fluid medium, typically drill mud, has a flow stream through the bore 4 from a source, not shown, in the direction of the arrow 8.

The valve 2 has three major sections. The first section of the valve 2 is a means for accelerating the flow stream, a region of the valve 2 represented by the dashed line box 10, in which a funnel shaped, generally conically converging surface 12 serves to increase the kinetic energy of the flow stream as the flow stream discharges from the acceleration region 10. The contour of the funnel shaped surface 12 is configured to both increase the kinetic energy of the flow stream by convergence or acceleration of the flow stream and minimize turbulence, as well known in the art.

The second major section of the valve 2 is a means for diffusing the flow stream, a region of the valve 2 represented by the dashed line box 14, in which a funnel shaped, generally conically diverging surface 18 is coupled to the acceleration region 10 to accept the accelerated flow stream discharged it. The contour of the conically diverging surface 18 is configured to both substantially decrease the kinetic energy of the accelerated flow stream by diffusion or deceleration of the flow stream and minimize turbulence, as well known in the art.

The coupling of the acceleration region 10 to the diffusion region 14 in valve 2 results in the valve 2 causing little insertion loss of kinetic energy in the flow stream. Because of the low turbulence, straight through design, most of the potential energy of the flow stream that is converted to kinetic energy resulting from the increase in velocity of the flow stream after passing through the acceleration region 10 of the valve 2 is recovered in the diffusion region 14, since the deceleration of the flow stream after passing through the diffusion region 14 reduces the flow stream velocity, thereby restoring the potential energy of the flow stream in accordance with the well known relationship represented by Bernoulli's equation.

The third major section of the valve 2 is the means for periodically disturbing diffusion of the flow stream by inducing turbulence, a section of the valve 2 generally represented by the dashed line box 20. The turbulence inducer 20 may comprise a variety of means for inducing turbulence into the flow stream as it is diffused within the diffusion region 14, such as at least one high pressure jet of fluid discharged through, or surface discontinuity protruding from, the diverging conical surface 18. In FIG. 1 the turbulence inducer 20 comprises a movable tab 22 that swivels about a pivot 24 when actuated by a control rod 26 acting on a tab bearing 28 when operated by an actuator 30. Fluid orifices 32 and 34 are shown coupled to the actuator 30 and vented to opposite ends of the valve 2 to schematically represent the inclusion of actuator assisting positive feedback when the actuator 30 moves the movable tab 22 into the flow stream, as further explained below.

Figure 2:
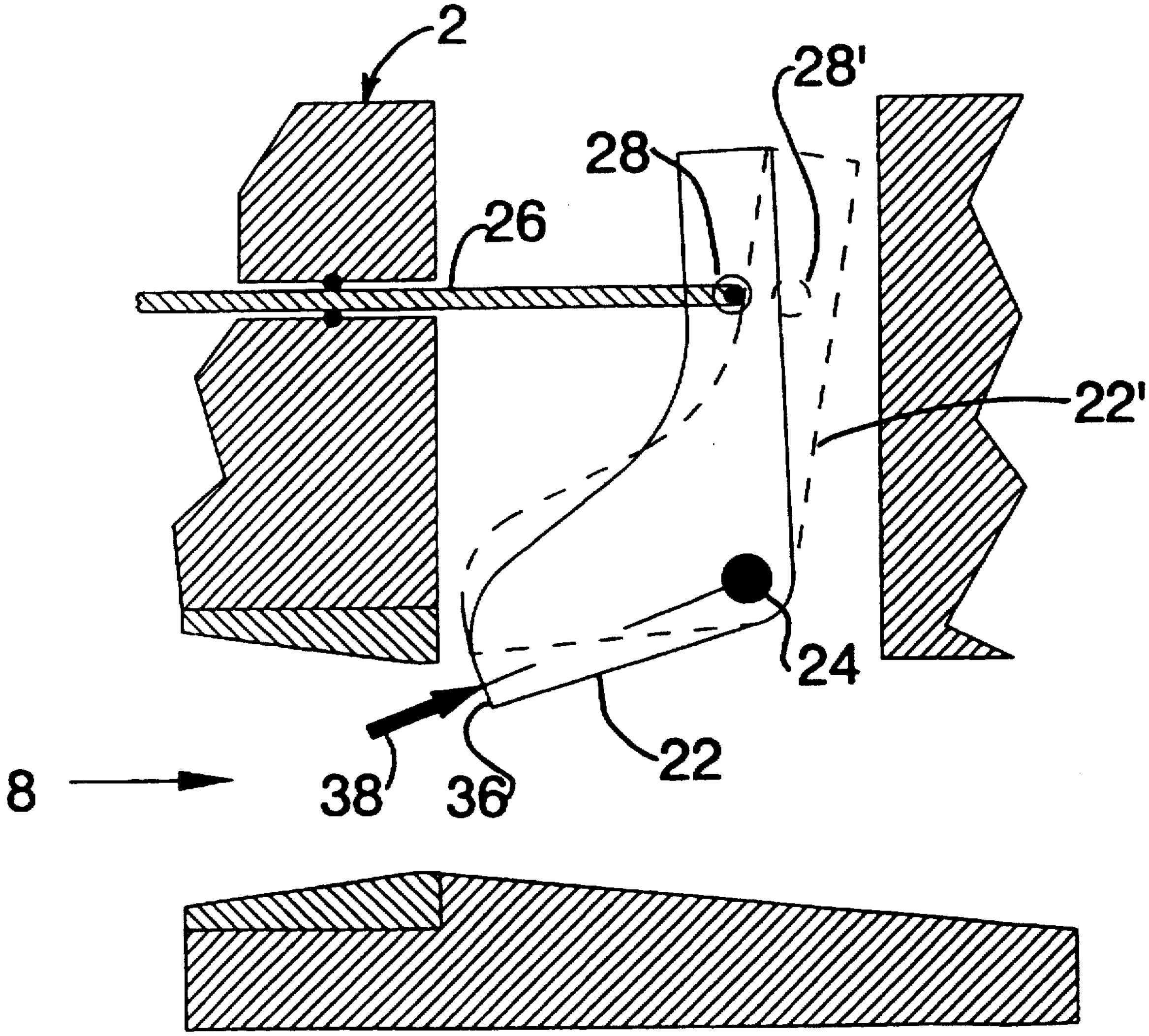
FIG. 2 shows a detailed cut away side view of the turbulence inducer in the preferred embodiment of the invention.

FIG. 2 is a detailed view of the movable tab 22 for the turbulence inducer 20 shown in FIG. 1. Because the velocity of the accelerated flow stream as it discharges from the accelerator region 10 is very high, it impinges on the movable tab 22 when extended with considerable force. The design of the movable tab 22 and associated actuation components is designed to minimize the tab actuation force supplied by the actuator 30.

In FIG. 2, movable tab 22 is shown in the activated or extended position, that is, the position that induces turbulence in the flow stream. The position of the movable tab 22 in the inactivated or retracted position is shown in dashed line as 22'. The control rod 26 is shown to contact the tab bearing 28 in both the activated position and the inactivated position, the inactivated position of the tab bearing being represented in dashed line as 28'.

The movable tab 22 has a contoured face surface 36 such that the fluid force impinging on it as it is extended into its actuated position, represented by the arrow 38, is directed through the pivot 24. Since the impinging force 38 is directed through the pivot 24, it does not create a moment about the pivot 24. Thus, the actuator 30 need only overcome the bearing friction of the pivot 24, so long as the valve 2 is pressure compensated for hydrostatic pressure.

Furthermore, the fluid pressure immediately upstream from the valve 2 will normally be not much higher than the fluid pressure immediately downstream from the valve 2 when the movable tab 22 is retracted. When extended, the upstream pressure will be much higher than the downstream pressure. Therefore, the valve 2 may optionally include the fluid orifices 32 and 34 that direct positive feedback fluid pressure to opposite sides of the operator 30 as it extends the movable tab 22 to minimize applied force. The actuator 30 may be of any well known type, and may have electrical, mechanical, hydraulic or pneumatic actuation, depending on system requirements. The actuator 30 is typically controlled by at least one associated parameter sensor, not shown, that signals the operation of the actuator 30.

Figure 3:
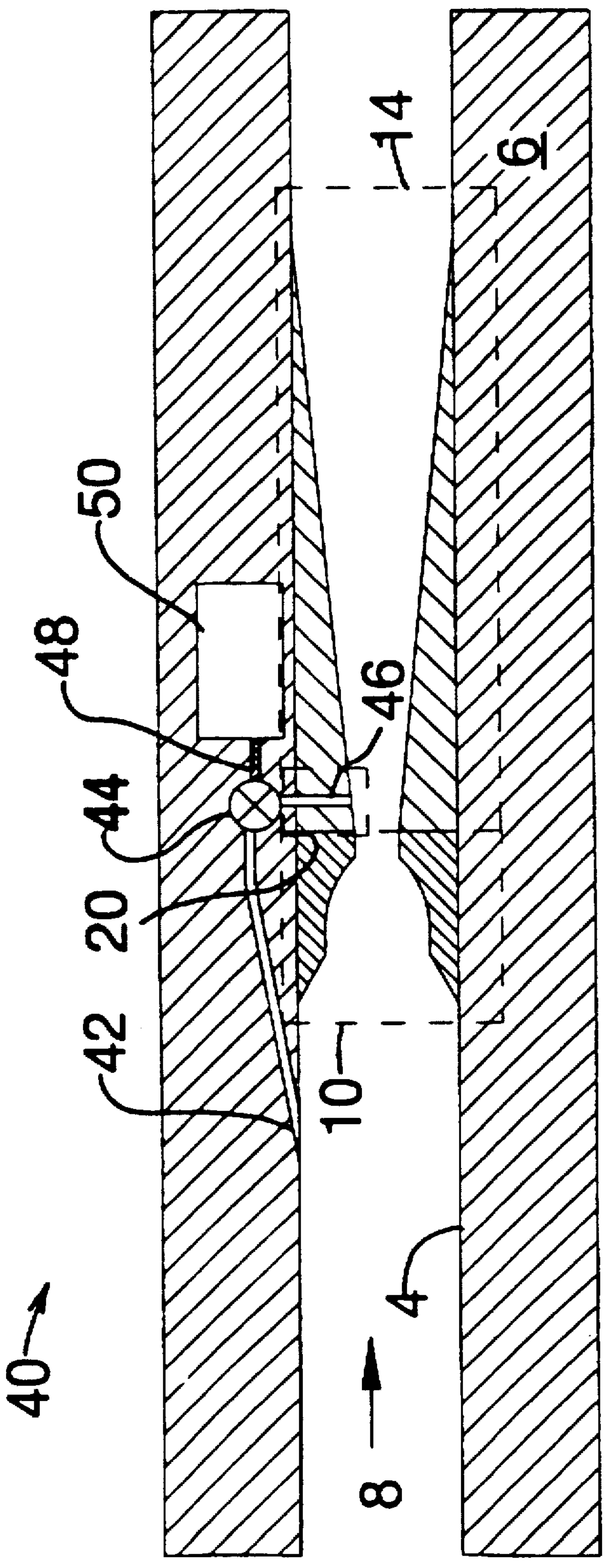
FIG. 3 is a cut away side view of a first alternate embodiment of the invention.

The turbulence inducer need not be mechanical, as described in the preferred embodiment described above. For instance, the turbulence inducer may comprise a small secondary flow stream that is injected into the flow stream for this purpose. FIG. 3 shows a cut away side view of a first alternate embodiment of the invention that has such a turbulence inducer.

In FIG. 3, a valve 40 according to the invention with the turbulence inducer 20 comprises an inlet fluid orifice 42, a pilot valve 44, an outlet fluid orifice 46, a control rod 48 and an actuator 50. The inlet orifice 42 is coupled to the flow stream upstream from the accelerator section 10 and the outlet orifice 46 is coupled to the flow stream in the diffuser section 14. The pilot valve 44 couples the inlet orifice 42 to the output orifice 46 when the actuator opens the pilot valve 44 with the control rod 48. This allows a secondary flow stream to pass from the upstream side of the accelerator section 10 through the inlet orifice 42, the pilot valve 44 and the outlet orifice 46 into the diffuser section 14, thereby inducing turbulence. The actuator 50 is controlled by at least one associated parameter sensor in the manner described with respect to the actuator 30 in connection with the preferred embodiment shown in FIG. 1.

Figure 4:
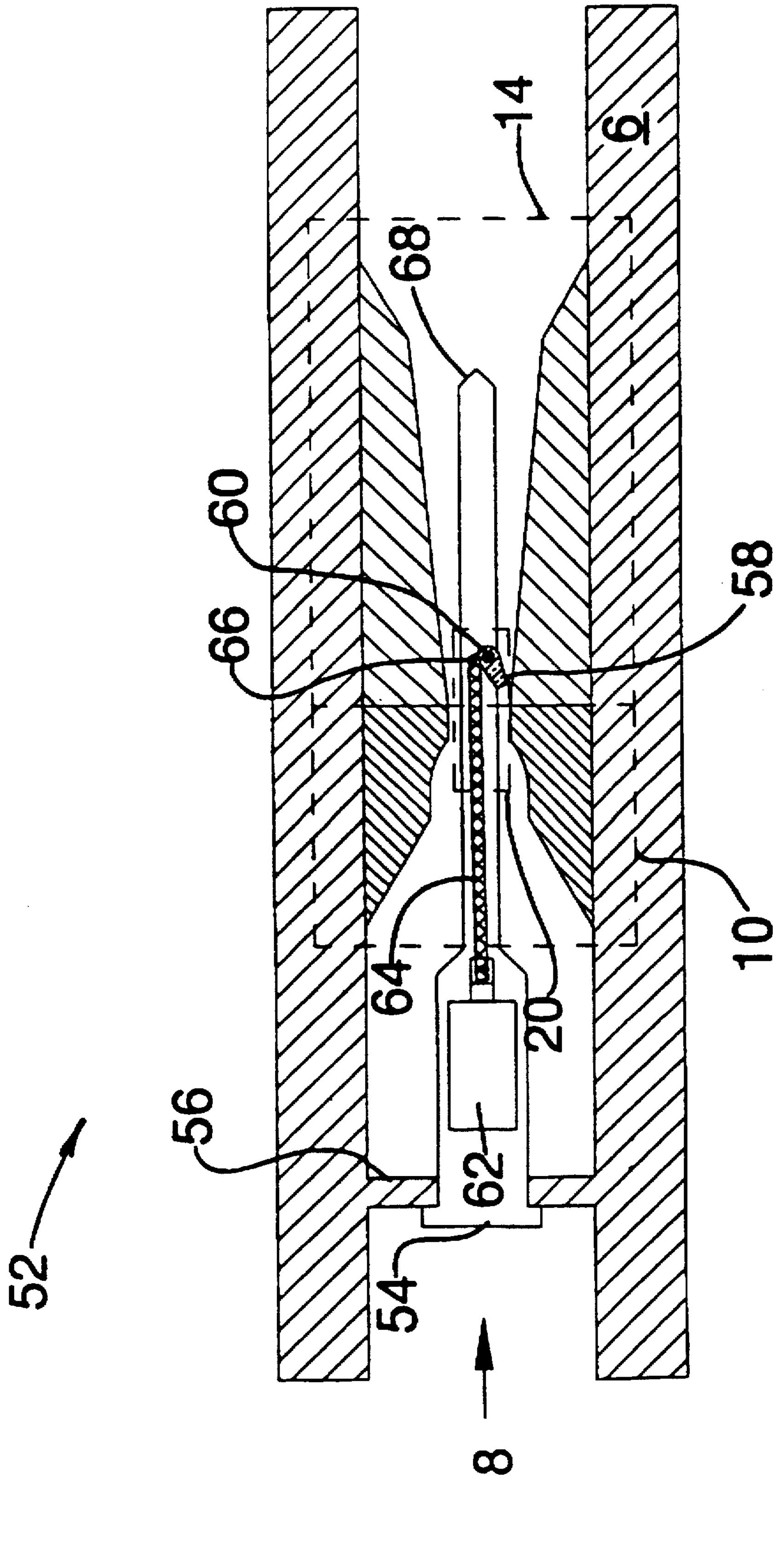
FIG. 4 is a cut away side view of a second alternate embodiment of the invention.

The turbulence inducer may advantageously be of a design to permit remote removal from within the drill collar. A second alternate embodiment of the invention with such a feature is shown in FIG. 4. A valve 52 according to the invention with the turbulence inducer 20 comprises an annular removable housing 54 that is seated in a stay 56, a movable tab 58 that swivels about a pivot 60, and an actuator 62 that moves a control rod 64 connected to a bearing 66 on the movable tab 58 to extend or retract the movable tab 58 from the housing 54.

In the embodiments of the invention described thus far, the turbulence inducer has been generally introduced downstream from the acceleration section of the valve. It may be advantageous to introduce the turbulence inducer within the acceleration region itself to cause turbulence that is transferred downstream into the diffusion section of the valve. A cut away side view of a third alternate embodiment of the invention that includes this feature is shown in FIG. 5.

Figure 5:
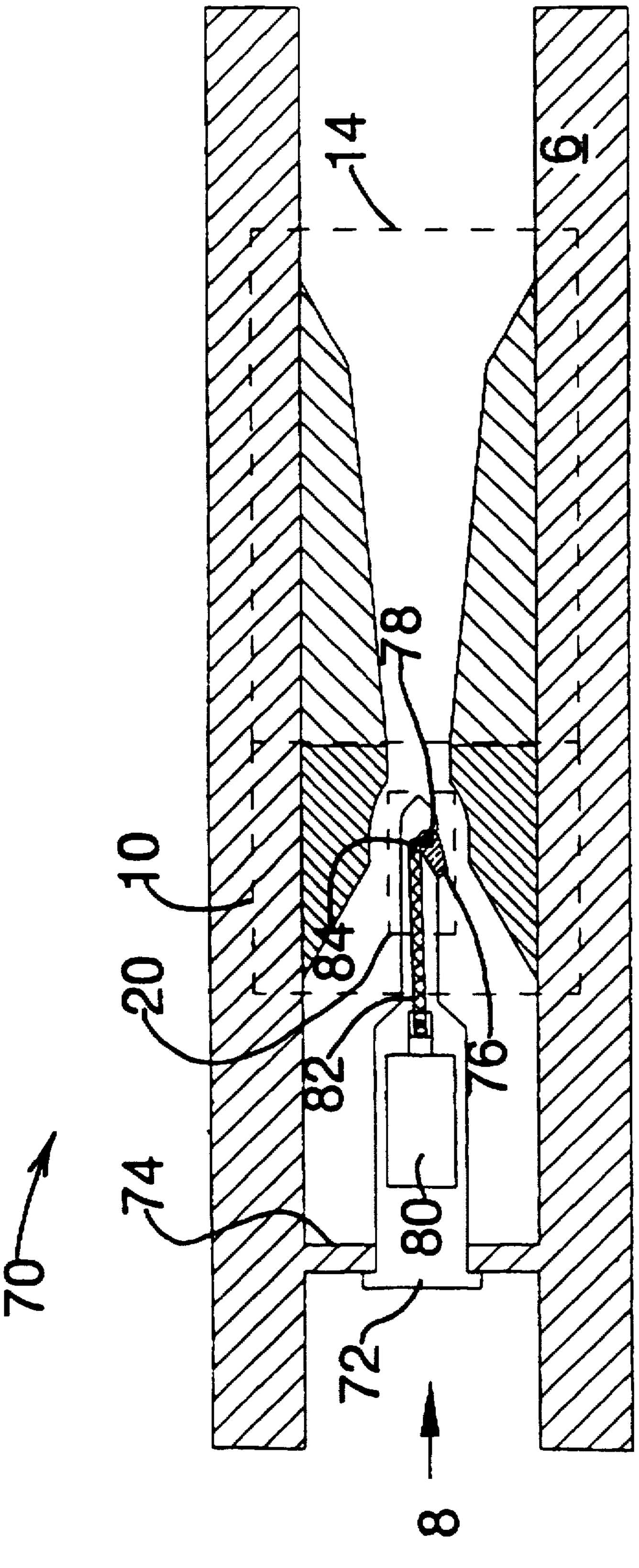
FIG. 5 is a cut away side view of a third alternate embodiment of the invention.

In FIG. 5 a valve 70 according to the invention with the turbulence inducer 20 located within the acceleration section 10 is shown, wherein the turbulence inducer 20 comprises an annular removable housing 72 seated in a stay 74, a movable tab 76 that swivels about a pivot 78, and an actuator 80 that moves a control rod 82 connected to a bearing 84 on the movable tab 76 to extend or retract the movable tab 76 from the housing 72.

In all the embodiments described above, that include a mechanical turbulence inducer, the pressure signal developed, for any prescribed amount of protrusion of the turbulence inducing element into the flow stream, will be proportional to the square of the flow rate. This may be undesirable when the flow rate varies substantially.

In the case of the second alternate embodiment of the invention described above in connection with FIG. 4, the outer surface of the annular housing 54 may be contoured to offer a greater or lesser flow area for the flow stream between the accelerator section 10 and the diffuser section 14 depending on how far the annular housing 54 is inserted within the valve 2. If, for instance, the outer housing 54 has a surface that is contoured to offer less flow area as the housing 54 is inserted deeper into the valve 2, the velocity of the flow stream exiting the acceleration section 10 will increase due to the smaller flow area.

Overall quiescent pressure drop of the valve 2 will not increase substantially because of the action of the diffuser section 14. However, due to the increased developed velocity, the turbulence generated with the movable tab 58 will be greater, so that it can develop the same pressure signal with less flow. Therefore, when the flow stream rate drops off, the housing 54 may be inserted deeper into the valve to maintain the developed pressure signal.

For the preferred embodiment of the invention, as well as the third alternate embodiment of the invention, it is desirable to provide means for controlling the amount of protrusion of the turbulence inducing element in response to the flow rate of the flow stream to maintain a constant developed pressure signal. That is, as flow rate increases, the protrusion of the turbulence decreases to maintain a relatively constant developed pressure signal.

For instance, a pressure sensor mounted in or immediately upstream the valve can be used to move a stop for the movable tab in the embodiments described above that include the movable tab. If the level of the developed pressure signal starts to increase due to increased flow stream rate, the pressure sensor causes the position of the tab stop to change. The position of the tab stop changes in this case to reduce the maximum excursion of the movable tab such that the developed pressure signal returns to the prescribed level. Similarly, if the level of the developed pressure signal starts to decrease due to decreased flow stream rate, the pressure sensor causes the tab stop to change position to let the maximum excursion of the movable tab increase, thus returning the pressure signal level back to normal.

Figure 6:
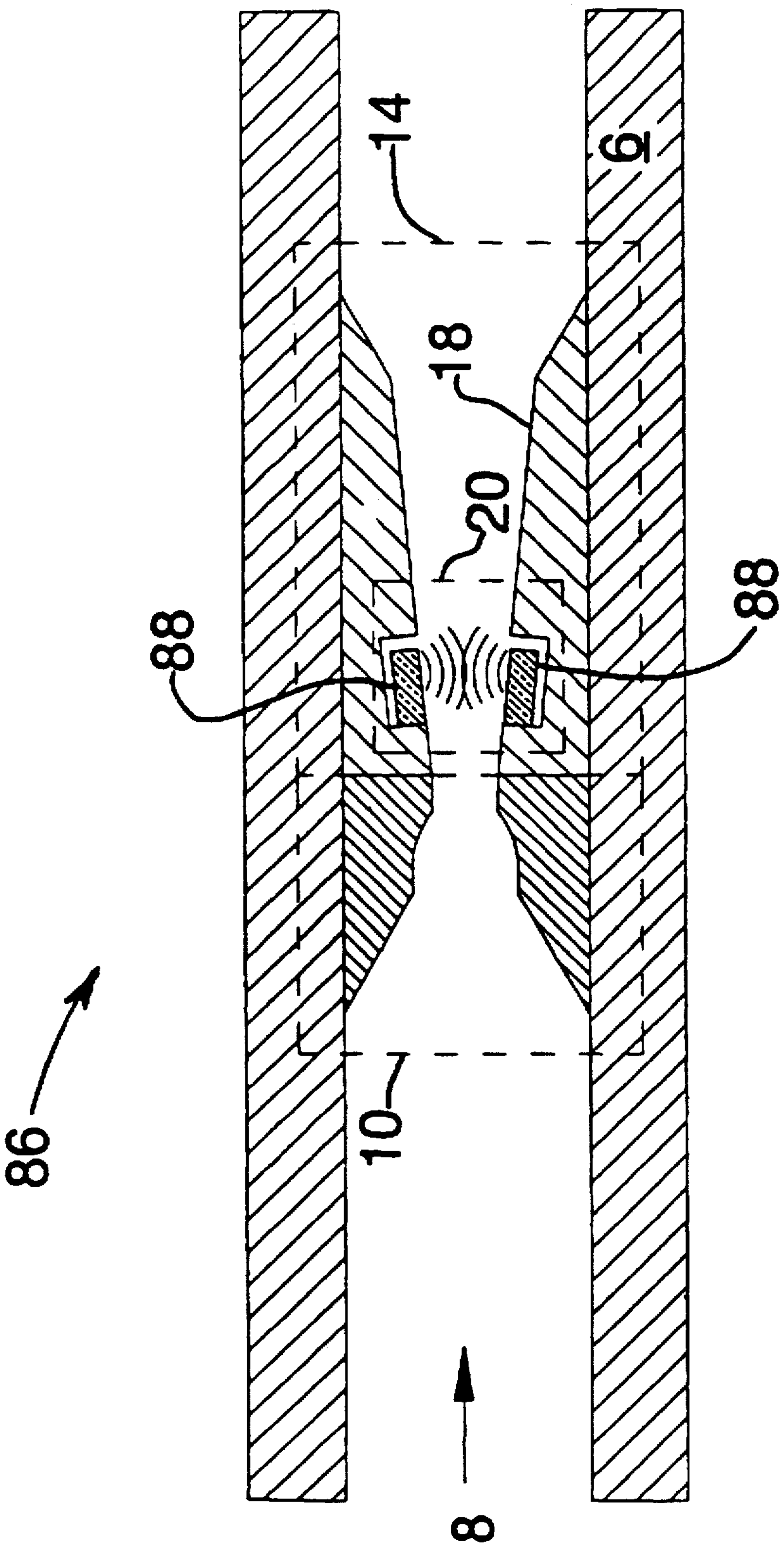
FIG. 6 is a cut away side view of a fourth alternate embodiment of the invention.

Of course, the diffusion of the flow stream may be disturbed by other means, such as by vibration, such as with piezoelectric elements or with expanding bladders appropriately positioned in either the diffusion section of the valve or upstream from the diffusion section such that turbulence is generated within the diffusion section. FIG. 6 shows a fourth alternate embodiment of the invention that includes a piezoelectric turbulence inducer. A valve 86 according to the invention with a turbulence inducer 20 comprises at least one, and preferably two or more, piezoelectric elements 88 that are mounted flush in the conically diverging surface 18 of the diffusion section 14 in the valve 86. Two of the piezoelectric elements 88 are visible in FIG. 6.

Since the piezoelectric elements 88 are mounted flush with the conically diverging surface 18, they have no turbulence effect with no signal applied to them. However, when a direct current sensor or controller signal is applied to the elements 88 of sufficient electrical potential, the elements bend away from the surface 18 into the diffusing flow stream, thereby inducing turbulence. If an alternating current signal is applied instead, the elements 88 will similarly induce turbulence by vibration of the flow stream.

The piezoelectric elements 88 have the great advantage of being drivable directly by output sensors or controllers with electrical outputs, thereby minimizing mechanical complexity. The sensor or controller drive signal can be modified by the flow stream rate to maintain relatively constant pressure signal delivery regardless of flow stream rate, if desired.

Figure 7:
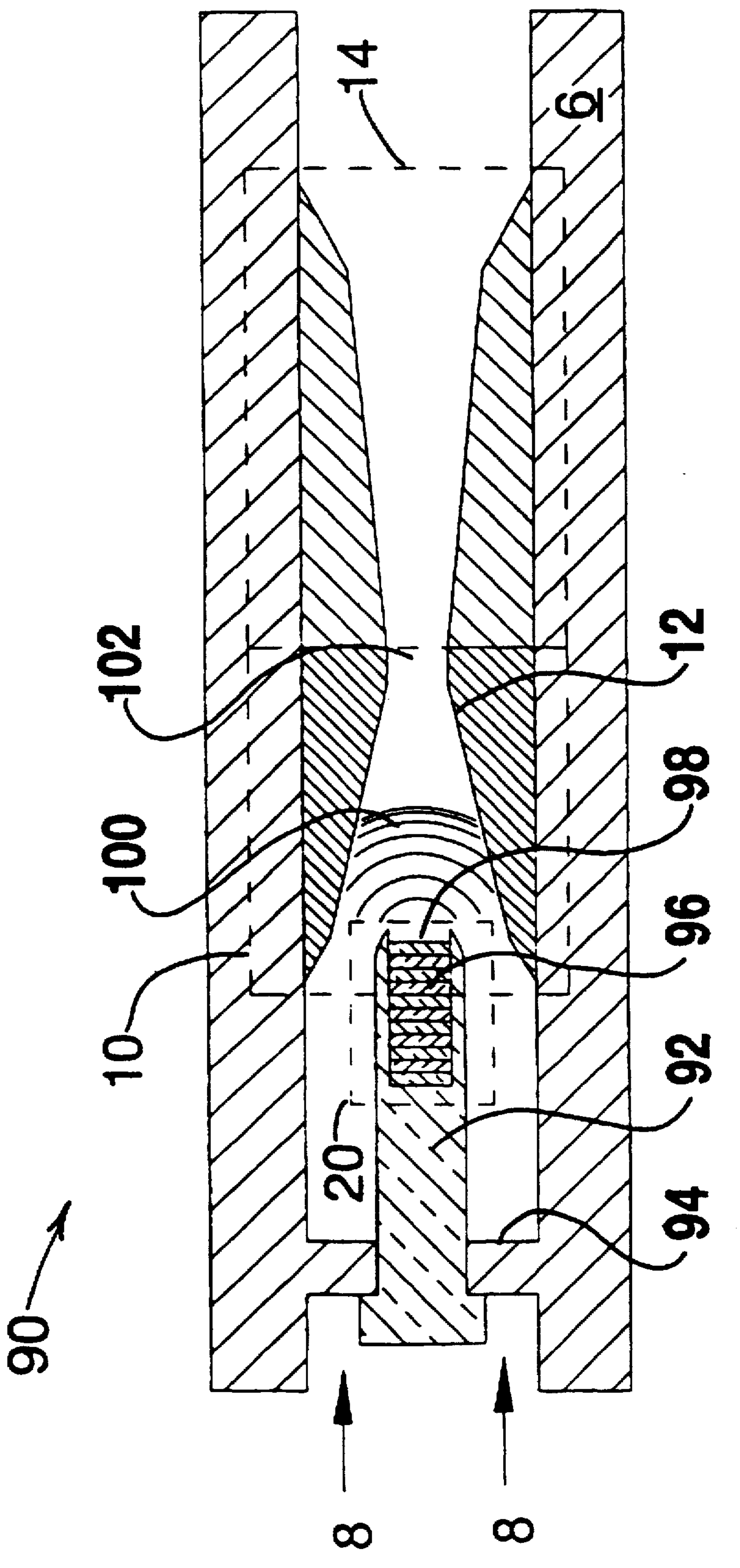
FIG. 7 is a cut away side view of a fifth alternate embodiment of the invention.

The turbulence inducer may advantageously be of a design to permit remote removal from within the drill collar, similar to the second and third embodiments of the invention described in connection with FIGS. 4 and 5, but of the piezoelectric type. FIG. 7 shows a fifth alternate embodiment of the invention that includes such a piezoelectric turbulence inducer.

A valve 90 according to the invention with the turbulence inducer 20 located upstream of the acceleration section 10 is shown, wherein the turbulence inducer 20 comprises an annular removable housing 92 seated in a stay 94. One or more piezoelectric elements 96 are attached to the housing 92 such that their free ends 98 are either directly or indirectly exposed to the fluid stream and oriented to vibrate in a direction approximately parallel to flow when actuated by an alternating current sensor or controller signal.

As the free ends 98 of the elements 96 vibrate at the frequency of the alternating current signal, pressure waves 100 are generated in the flow stream. The converging conical surface 12 of the accelerator section 10 is contoured to focus and reflect the pressure waves 100 toward an outlet 102 of the acceleration section 10 so that the flow stream undergoes high transverse turbulence. This turbulence disrupts the conversion of kinetic energy to potential energy in the diffuser section 14 and thus causes an increase in upstream pressure. Alternately the piezoelectric elements 96 can be located downstream of the diffuser section 14 and oriented to direct the pressure waves 100 back into the diffuser section 14 to accomplish the same purpose.

In all of the embodiments of the invention described above, the shape of the acceleration section of the valve is configured to develop a flow stream velocity that produces the desired pressure signal that results when turbulence is induced in the valve. As well known in the art, the smaller the outlet area of the acceleration section, the greater the pressure drop, unless the flow stream is effectively diffused.

In all of the embodiments of the invention described above, the shape of the diffusion section is configured to maximize conversion of kinetic energy in the accelerated flow stream back to potential energy, thereby minimizing quiescent pressure drop in the valve. A straight walled diffuser is generally desirable for this purpose when the solid angle of the conical shape is not greater than 30 degrees and not less than 3 degrees. A more desirable range of solid angle for such a straight walled diffuser is between 5 and 15 degrees, with approximately 11 degrees being ideal for diffusion sections of reasonable length.

Although the preceding embodiments of the invention have been described and shown in the context of MWD applications, It is believed that the valve according to the invention may find applications in other fields. The same general designs of the valves according to the invention described above may be adopted for other applications that require pressure control and signaling devices.

Figure 8:
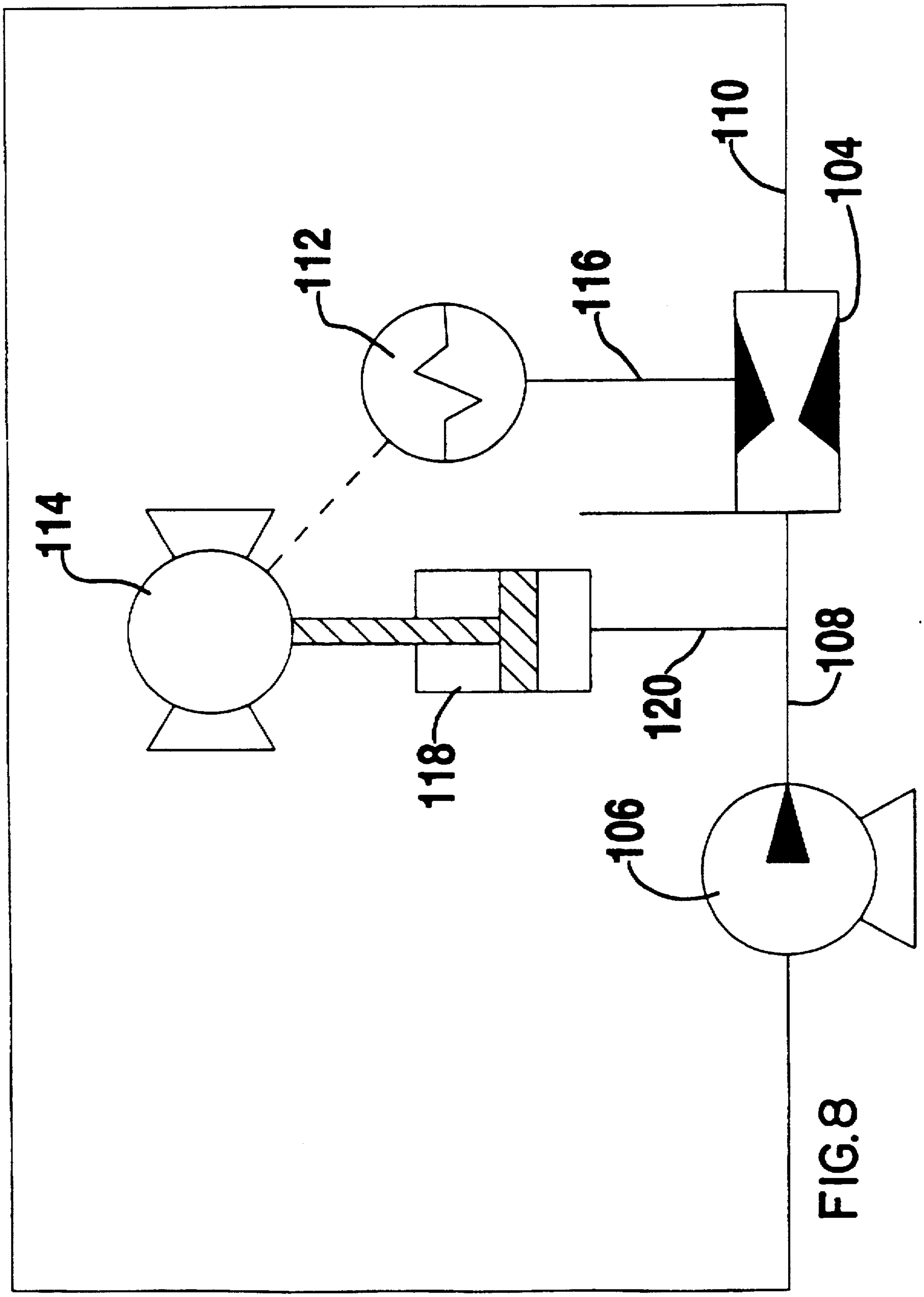
FIG. 8 is a schematic diagram of a process control system that uses a valve according to the invention for valve actuator positioning.

FIG. 8 is a schematic diagram of a process control system that uses a valve 104 incorporating the piezoelectric type of turbulence inducer, typically a small scale version of such as shown in the fourth embodiment of the invention in connection with FIG. 6. A pump 106 normally pumps hydraulic control fluid through the valve 104 that is coupled to it with a supply line 108 and a return line 110. In a quiescent condition, there is little pressure drop across the valve 104, so the pump 106 consumes little power just to circulate the control fluid.

However, when an electronic controller 112 for a process valve 114, or any similar pressure controlled device, detects an error condition with respect to position of the valve 114, the controller 112 sends a corresponding error signal to the valve 104 on a signal line 116. The piezoelectric elements (not shown) in the valve 104 generate turbulence that creates upstream pressure that is communicated to a hydraulic valve actuator 18 by a control line 120 that is coupled to the supply line 108.

The process valve 14 is operated by the actuator 18 and moves until the electronic controller 112 terminates the signal to the valve 104. Actually, the valve 104 may also be used in a floating point proportional mode, where the electronic controller 112 provides a quiescent bias signal that generates a small quiescent pressure drop across the valve 104, so that changes in the signal from the controller 112 cause proportional changes in the pressure drop communicated to the actuator 118. Thus, the developed pressure signal may be analog instead of digital pressure pulses when applications suit such mode of operation.

Process control systems may alternately have the process valve 114 mechanically coupled to a small scale version of any of the embodiments of the invention described above that use a mechanical turbulence inducer. In that case, the movable tab of the valve is coupled to the process valve so that no electronic controller is required, an advantage in hazardous environments.

Thus there has been described herein a method and apparatus for remotely generating pressure signals in a fluid stream for telemetry purposes with minimal insertion loss and susceptibility to blocking flow of the fluid stream by providing a straight through acceleration path for the fluid stream followed by a straight through diffusion path, wherein pressure pulses representing data are generated by turbulence resulting from periodic disturbances made in the diffusion path. It will be understood that various changes in the details, materials, steps and arrangement of parts that have been described and illustrated herein in order to explain the nature of the invention may be made by those of ordinary skill in the art within the principle and scope of the invention as expressed in the appended claims.

What is claimed is:

1. A method of generating pressure signals through a fluidic medium, comprising the steps of:
   - accelerating a flow stream of said fluidic medium to increase the kinetic energy of said flow stream;
   - diffusing said accelerated flow stream to substantially decrease the kinetic energy of said flow stream; and
   - periodically generating turbulence affecting said diffusion that creates said pressure signals for said flow stream upstream from said generated turbulence by extending a protuberance into said flow stream.

2. The method set forth in claim 1, wherein said step of extending said protuberance into said flow stream comprises the extension of said protuberance into said diffusing flow stream.

3. The method set forth in claim 1, wherein said step of extending said protuberance into said flow stream comprises the extension of said protuberance into said accelerating flow stream.

4. A method of signaling parameter data through a fluidic medium, comprising the steps of:
   - accelerating a flow stream of said fluidic medium to increase the kinetic energy of said flow stream;
   - diffusing said accelerated flow stream to substantially decrease the kinetic energy of said flow stream; and
   - periodically generating turbulence affecting said diffusion that creates positive upstream pressure pulses for said flow stream that correspond to said parameter data by extending a protuberance into said flow stream.

5. The method set forth in claim 4, wherein said step of extending said protuberance into said flow stream comprises the extension of said protuberance into said diffusing flow stream.

6. The method set forth in claim 4, wherein said step of extending said protuberance into said flow stream comprises the extension of said protuberance into said accelerating flow stream.

7. A method of signaling parameter data through a fluidic medium, comprising the steps of:

accelerating a flow stream of said fluidic medium to increase the kinetic energy of said flow stream;

diffusing said accelerated flow stream to substantially decrease the kinetic energy of said flow stream; and periodically generating turbulence affecting said diffusion that creates positive upstream pressure pulses for said flow stream that correspond to said parameter data by extending a protuberance into said flow stream.

8. The method set forth in claim 7, wherein said step of extending said protuberance into said flow stream comprises the extension of said protuberance into said diffusing flow stream.

9. The method set forth in claim 7, wherein said step of extending said protuberance into said flow stream comprises the extension of said protuberance into said accelerating flow stream.

10. Apparatus for generating pressure signals through a fluidic medium, comprising:

means for accelerating a flow stream of said fluidic medium to increase the kinetic energy of said flow stream;

means for diffusing said accelerated flow stream to substantially decrease the kinetic energy of said flow stream; and means for periodically generating turbulence affecting said diffusion that creates said pressure signals for said flow stream upstream from said generated turbulence comprising means for extending a protuberance into said flow stream.

11. The apparatus set forth in claim 10, wherein said means for extending said protuberance into said flow stream comprises means for extending said protuberance into said diffusing flow stream.

12. The apparatus set forth in claim 10, wherein said means for extending said protuberance into said flow stream comprises means for extending said protuberance into said accelerating flow stream.

13. Apparatus for signaling parameter data through a fluidic medium, comprising:

means for accelerating a flow stream of said fluidic medium to increase the kinetic energy of said flow stream;

means for diffusing said accelerated flow stream to substantially decrease the kinetic energy of said flow stream; and means for periodically generating turbulence affecting said diffusion that creates positive upstream pressure pulses for said flow stream that correspond to said parameter data comprising means for extending a protuberance into said flow stream.

14. The apparatus set forth in claim 13, wherein said means for extending said protuberance into said flow stream comprises means for extending said protuberance into said diffusing flow stream.

15. The apparatus set forth in claim 13, wherein said means for extending said protuberance into said flow stream comprises means for extending said protuberance into said accelerating flow stream.

16. The apparatus set forth in claim 13, wherein said means for periodically generating turbulence further comprises Apparatus for signaling parameter data through a fluidic medium, comprising the steps of:

means for accelerating a flow stream of said fluidic medium to increase the kinetic energy of said flow stream;

means for diffusing said accelerated flow stream to substantially decrease the kinetic energy of said flow stream; and means for periodically generating turbulence affecting said diffusion that creates positive upstream pressure pulses for said flow stream that correspond to said parameter data comprising means for extending a protuberance into said flow stream.

17. The apparatus set forth in claim 16, wherein said means for extending said protuberance into said flow stream comprises means for extending said protuberance into said diffusing flow stream.

18. The apparatus set forth in claim 16, wherein said means for extending said protuberance into said flow stream comprises means for extending said protuberance into said accelerating flow stream.

* * * * *

UNITED STATES PATENT AND TRADEMARK OFFICE

CERTIFICATE OF CORRECTION

PATENT NO. : 5,802,011

DATED : September 1, 1998

INVENTOR(S) : Warren J. Winters, Tommy M. Warren

It is certified that error appears in the above-identified patent and that said Letters Patent is hereby corrected as shown below:

| Col. | Line | |
|---|---|---|
| 7 | 66 | "actuator 18" should read: "actuator 118" |
| 8 | 1 | "valve 14 is operated by the actuator 18" should read: "valve 114 is operated by the actuator 118" |

Signed and Sealed this

Twenty-first Day of September, 1999

Attest:

Q. TODD DICKINSON

Attesting Officer

*Acting Commissioner of Patents and Trademarks*